Nov. 25, 1969  M. J. PRYOR  3,480,411
COMPOSITE FIN STOCK MATERIAL
Filed Jan. 23, 1967
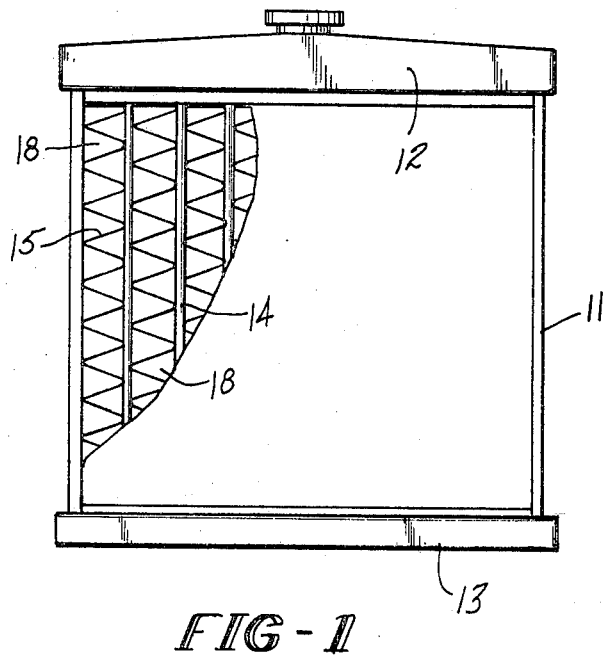
FIG-1
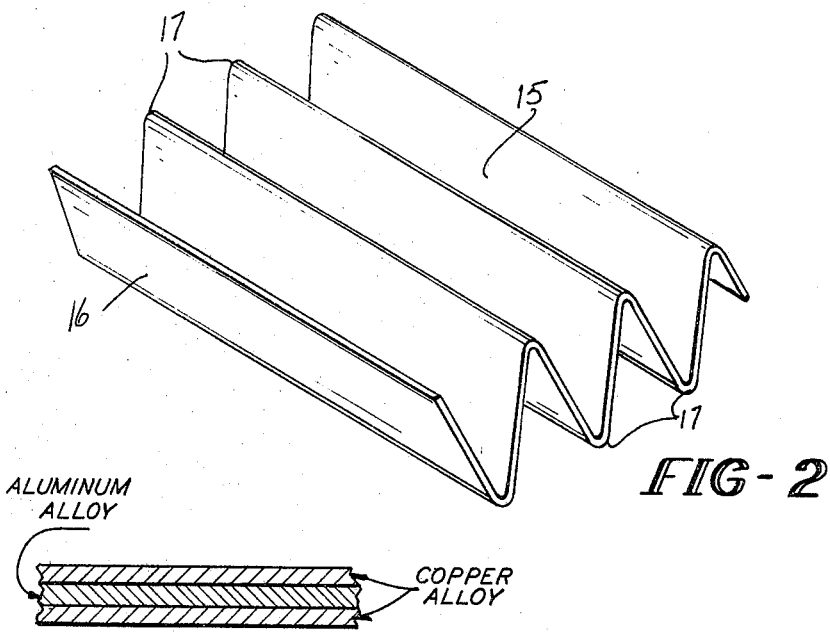
FIG-2
FIG-3
INVENTOR:
MICHAEL J. PRYOR
BY Rob W. Bachman
ATTORNEY United States Patent Office 3,480,411
Patented Nov. 25, 1969

3,480,411
COMPOSITE FIN STOCK MATERIAL
Michael J. Pryor, Hamden, Conn., assignor to Olin Mathieson Chemical Corporation, a corporation of Virginia
Filed Jan. 23, 1967, Ser. No. 611,018
Int. Cl. B21j 1/00
U.S. Cl. 29—191                                      8 Claims

ABSTRACT OF THE DISCLOSURE

The present invention relates to a composite metallurgically bonded fin stock material and a heat exchange assembly including same wherein said fin stock material has an aluminum base alloy core clad on both sides with copper.

---

The present invention relates to a fin stock material for use in heat exchangers. More particularly, the present invention resides in a highly advantageous composite fin stock material for use particularly in automotive radiators.

Huge quantities of copper are consumed annually as fin stock material, particularly in automotive radiators. Fin stock material must be highly solderable and have excellent thermal conductivity. Essentially unalloyed copper has the advantage of being highly solderable and has the excellent thermal conductivity required in fin stock applications.

Unfortunately, however, essentially unalloyed copper suffers from the significant disadvantage that during soldering of the copper fins to the tubes of the heat exchanger, a very significant softening of the cold worked copper occurs. This significantly detracts from the strength of the overall assembly.

The use of copper alloys with a higher softening point has been suggested. These alloys do exist; but unfortunately they are generally quite costly and/or lack the excellent solderability and workability of unalloyed copper.

Accordingly, it has been suggested that aluminum alloys be used as fin stock material. Unalloyed aluminum has only about two-thirds the thermal conductivity of copper. However, its much lower density makes aluminum basically attractive for fin stock applications. Wide spread use of aluminum into the automotive and fin stock field has, however, been severely limited because of the extremely poor solderability of this metal.

In order to find a fin stock material satisfying the diverse necessary requirements the use of composite materials has been suggested. Thus, certain composites of copper clad on commercial purity aluminum have been used on a limited basis for fin stock material. However, those composite materials with acceptable thermal conductivity suffer from the same disadvantage of copper in that the soldering operation itself will serve to anneal the commercial purity aluminum and copper thereby reducing the strength to unacceptably low values. By the same token, those aluminum alloys with high annealed temper yield strength and which show good strength after soldering, likewise possess unacceptably low thermal conductivity.

Accordingly, it is a principal object of the present invention to provide an improved composite material.

It is a particular object of the present invention to provide an improved composite fin stock material.

It is an additional object of the present invention to provide a material as aforesaid which has the requisite high solderability and thermal conductivity required in fin stock applications.

It is a still further object of the present invention to provide a material as aforesaid which does not significantly soften during soldering.

Further objects and advantages of the present invention will appear hereinafter.

In the drawings:

FIGURE 1 is a front view, with portions cut away, of an automobile radiator illustrating one use of the composite, metallurgically bonded fin stock of the present invention;

FIGURE 2 is a partial perspective view of the composite, metallurgically bonded fin stock of the present invention in the folded or corrugated state; and FIGURE 3 is a schematic partial sectional view of the composite, metallurgically bonded fin stock of the present invention.

In accordance with the present invention it has now been found that the foregoing objects and advantages may be readily obtained. The composite metallurgically bonded fin stock of the present invention consists essentially of a core of an aluminum base alloy containing over 90% aluminum clad on both sides with a high conductivity solderable copper base alloy, with the thickness of the claddings being less than one-third of the total composite thickness, per side, said composite having:

(A) A thermal conductivity of at least 233 B.t.u./ft.$^2$/ft./hour./°F. based on an equal weight of copper;

(B) A yield strength at room temperature after 30% cold rolling from the annealed condition of at least 47,000 p.s.i. at equal weight to copper at maximum cladding thickness; and (C) A yield strength, after cold rolling 30% from the annealed condition and heating at 600° F. for 1 hour and cooling to room temperature of at least 19,000 p.s.i. at equal weight to copper and at maximum cladding thickness.

In particular, the foregoing composite alloy may be used as corrugated fin stock material having a total thickness less than 0.030".

The composite metallurgically bonded fin stock of the present invention provides numerous advantages over conventional fin stock material. The composite material may be processed in a manner essentially identical to that of aluminum or copper itself. In addition, it may be readily formed into cold worked, corrugated fins suitable for insertion into various heat exchange devices.

Unlike other solid or composite metals, the composite material of the present invention will not greatly soften within the temperature range of normal soldering operations, for example, a treatment of one hour at 600° F. simulates this operation. Furthermore, the loss of strength of the core of the present invention by recovery below its recrystallization temperature is essentially non-existent. Accordingly, essentially all of the original cold worked strength of the core can be retained after a soft soldering operation in which the fin is joined to the appropriate heat exchange tube or tubes.

The surface layers of solderable copper alloys metallurgically bonded to the aluminum core provide the premium solderability that is required in this application.

The core material may be any aluminum base alloy containing from 0 to 1.0% iron plus silicon and from 0.1 to 0.5% zirconium, with the zirconium preferably essentially precipitated as finely divided zirconium aluminide. In addition, the aluminum alloy of the core may contain various impurities or alloying additions, with one or more of the following materials being prefetrred: chromium from 0.05 to 0.5%; manganese from 0.1 to 1.0%; vanadium from 0.05 to 0.5%; and molybdenum from 0.05 to 0.5%, with all percentages being weight percentages. A particularly preferred core material is aluminum alloy X8040 containing the foregoing requisite quantity of zirconium.

The aluminum core material has a thermal conductivity of greater than 90 B.t.u./ft.$^2$/ft./hour/° F., a yield strength after 30% cold reduction from the annealed condition of no less than 19,000 p.s.i. and a yield strength after 30% cold reduction from the annealed condition followed by heating for one hour and cooling to room temperature of no less than 13,500 p.s.i.

The zirconium addition to the alloy of the core material has the particular advantage that it does not significantly decrease the thermal or electrical conductivity of the aluminum base alloy which is thereby maintained at a high and acceptable value.

The cladding material may be any copper or copper base alloy having a thermal conductivity of at least 210 B.t.u./ft.$^2$/ft/hour/° F The copper cladding material should have a total thickness of less than one-third of the total thickness of the composite per side, i.e., the total cladding thickness may comprise up to two-thirds the total thickness of the composite. Essentially unalloyed copper is preferred; however, alloyed copper materials may be also readily employed. Examples of representative materials include: oxygen-free, high conductivity; commercial purity copper; copper alloy 110 (Copper Development Association designation) containing 99.90% minimum copper, oxygen 0.05% maximum, 0.003% phosphorus maximum; and copper alloy 114 (Copper Development Association designation) containing 99.90% minimum copper, oxygen 0.05% maximum, silver 0.034 to 0.0476%, with the minimum copper content including silver.

The manner of bonding the core and cladding is not particularly critical and any desired process may be readily employed. It is only necessary that the cladding be firmly bonded to the core so that the composite will withstand the severe forming operations involved in manufacturing conventional fin stock material.

The characteristics of the composite are as follows:
(A) A thermal conductivity of at least 233 B.t.u./ft.$^2$/ft./hour/° F based on an equal weight of copper;
(B) A yield strength at room temperature after 30% cold rolling from the annealed condition of at least 47,000 p.s.i. at equal weight to copper at maximum cladding thickness; and
(C) A yield strength, after cold rolling 30% from the annealed condition and heating at 600° F. for 1 hour and cooling to room temperature of at least 19,000 p.s.i. at equal weight to copper and at maximum cladding thickness.

It is well known in electrical power transmission technology that the electrical conductivity and strength of aluminum on an equal thickness basis is greatly inferior to that of copper. However, the density of aluminum is less than one-third that of copper. Therefore, when the two metals are compared on an equal weight basis, aluminum is substantially superior to copper and so has substantially displaced copper from this feld of use.

Accordingly, what has been done in the present specification is to calcuate what characteristics pure copper would have at an equal weight with the composite of the present invention. This illustrates the advantages of the composites of the present invention.

In the characteristics of the composites of the present invention, 30% cold rolled is used since the bulk of copper fin stock applications lie between 20–40% cold rolled.

In accordance with the present invention a high strength heat exchange assembly may be readily prepared utilizing the fin stock material of the present invention, as shown in the appended drawings. Referring to FIGURE 1, the radiator assembly includes a heat dissipating unit or core 11 having at opposite ends a top tank or inlet header 12, and a bottom tank or outlet header 13, adapted for connection, respectively, with the discharge and intake conduits of a cylinder block cooling jacket. For the flow of cooling medium from one tank to the other the core 11 is made up of a number of fluid passageways or water tubes 14, spaced apart by fin strips 15 of the present invention. The fin strip shown in the drawing is of folded or corrugated outline providing a series of fins 16 between folds or connecting members 17. The strips 15, therefore, extend between adjacent walls to the adjoining tubes to divide the space into a number of relatively small air cells or conduits 18. Ordinarily, the opposite edges or front and rear faces of the core assembly are dipped first in a flux and then in molten solder to seal the margins of the walls of the water tubes where necessary and to join the fin strips to the walls. If the passageways and fin strips are evenly formed so as to make possible continuous contact from edge to edge, there will be an inward capillary flow of solder toward the center of the core, and a positive bond will result throughout substantially the entire depth of the core to insure the free flow of heat into the fins.

The present invention will be more readily apparent from a consideration of the following illustrative examples.

EXAMPLE I

The composite fin stock of the present invention was prepared in the following manner. All components were cleaned and rolled together cold in one pass taking a total reduction of 70%. The aluminum core had a thickness of 0.050" going into the mill, to be clad on both sides with a copper alloy having a thickness of 0.050" on each side. Thus, the components had a total thickness of 0.150" going into the mill and the bonded composite exiting from the mill was 0.045" thick, with the core 0.015" clad on each side with 0.015" copper alloy.

The composite was then cold rolled to 0.007" gage followed by a flash anneal at 950° F. for 30 seconds. The material was then rapidly cooled to room temperature and cold rolled 30% to 0.005" gage.

EXAMPLES II–X

In accordance with these examples physical properties were determined on composite materials prepared in accordance with Example I. The properties are listed in the Table I, below, wherein in all cases th cladding material was copper alloy 110 (Copper Development Association designation) and wherein all physical properties are expressed on an equal weight basis for pure copper. In the following table the aluminum alloy core materials are Aluminum Association designations. Examples IX–X represent the comparative properties of copper alloys 110 and 114. It is noted that Examples II, III, IV and V do not meet the required properties of the composite of the present invention.

TABLE I

| Example | Material | Yield Strenght, K s.i. | | Thermal Conductivity, B.t.u./ft.²/ft./ hour/° F. |
|---|---|---|---|---|
| | | 30% Cold Rolled | 30% Cold Rolled, Heated 600° F. 1 Hr., Cooled to Room Temperature | |
| II | Aluminum alloy 1100 core-copper alloy 110 clad. | 46 | 11.7 | 250.2 |
| III | Aluminum alloy 3003 core-copper alloy 110 clad. | 49 | 15.6 | 233.0 |
| IV | Aluminum alloy 5050 core-copper alloy 110 clad. | 50.5 | 16.5 | 241.9 |
| V | Aluminum alloy 5052 core-copper alloy 110 clad. | 53.5 | 18.2 | 227.4 |
| VI | Aluminum alloy 8040 (0.6 Fe, 0.06 Si, 0.17 Zr) core-copper alloy 110 clad. | 50.5 | 20.8 | 250.2 |
| VII | Core of aluminum alloy containing 0.23 Zr, 0.46 Cr, 0.1 Fe, 0.05 Si-copper alloy 110 clad. | 49.5 | 22.6 | 236.3 |
| VIII | Core of aluminim alloy containing 0.4 Zr, 0.25 Cr, 0.3 Mn, 0.4 Fe, 0.1 Si-copper alloy 110 clad. | 50.5 | 23.5 | 233.0 |
| IX | Copper alloy 110 | 45 | 9 | 226.2 |
| X | Copper alloy 114 | 46 | 15 | 224 |

EXAMPLES XI–XIX

In accordance with these examples physical properties were determined on aluminum alloy core materials given the treatment outlined in Example I, without having been formed into a composite. In Table II, below, the aluminum alloys are Aluminum Association designations. Examples XVIII–XIX represent the comparative properties of copper alloys 110 and 114. It is noted that Examples XI, XII, XIII and XIV do not meet the required properties for core materials in the composites of the present invention.

TABLE II

| Example | Material | Yield Strength, K s.i. | | Thermal Conductivity 30% Cold Rolled, B.t.u./ft.²/ft/. hour/° F. |
|---|---|---|---|---|
| | | 30% Cold Rolled | 30% Cold Rolled, Heated 600° F. 1 Hr., Cooled to Room Temperature | |
| XI | Aluminum alloy 1100 | 17 | 5 | 129.9 |
| XII | Aluminum alloy 3003 | 21 | 6 | 91.8 |
| XIII | Aluminum alloy 5050 | 24 | 8 | 112 |
| XIV | Aluminum alloy 5052 | 30 | 12 | 78.4 |
| XV | Aluminum alloy 8040 (0.6 Fe, 0.60 Si, 0.17 Zr). | 24 | 18 | 129.9 |
| XVI | Aluminum alloy containing 0.23 Zr, 0.46 Cr, 0.1 Fe, 0.05 Si. | 22 | 22 | 98.6 |
| XVII | Aluminum alloy containing 0.4 Zr, 0.25 Cr, 0.3 Mn, 0.4 Fe, 0.1 Si. | 24 | 24 | 91.8 |
| XVIII | Copper alloy 110 | 45 | 9 | 226.2 |
| XIX | Copper alloy 114 | 46 | 15 | 224 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A composite, metallurgically bonded fin stock having a core of an aluminum base alloy containing over 90% aluminum clad on both sides with copper, with the thickness of the claddings being less than one-third of the total composite thickness, per side, said composite having:

(A) a thermal conductivity of at least 233 B.t.u./ft.²/ft./hour/° F. based on an equal weight of copper;

(B) a yield strength at room temperature after 30% cold rolling from the annealed condition of at least 47,000 p.s.i. at equal weight to copper at maximum cladding thickness; and (C) a yield strength, after cold rolling 30% from the annealed condition and heating at 600° F. for 1 hour and cooling to room temperature, of at least 19,000 p.s.i. at equal weight to copper and at maximum cladding thickness.

2. A composite, metallurgically bonded fin stock according to claim 1 wherein said aluminum base alloy core has a thermal conductivity of greater than 90 B.t.u./ft.²/ft./hour/° F., a yield strength after 30% cold reduction from the annealed condition of greater than 19,000 p.s.i. and a yield strength after 30% cold reduction from the annealed condition followed by heating for one hour and cooling to room temperature of greater than 13,500 p.s.i.

3. A composite according to claim 1 wherein said claddings have a thermal conductivity of at least 210 B.t.u./ft.²/ft./hour/° F.

4. A composite according to claim 1 wherein said aluminum base alloy core contains up to 1.0% iron plus silicon and from 0.1 to 0.5% zirconium.

5. A composite according to claim 4 wherein the zirconium is essentially precipitated as finely divided zirconium aluminide.

6. A composite according to claim 4 wherein said aluminum base alloy core contains at least one material selected from the group consisting of: chromium from 0.05 to 0.5%; manganese from 0.1 to 1.0%; vanadium from 0.05 to 0.5%; and molybdenum from 0.05 to 0.5%.

7. A composite according to claim 1 having a total thickness less than 0.030".

8. A composite fin stock material according to claim 1 in the corrugated condition.

References Cited

UNITED STATES PATENTS

| | | | |
|---|---|---|---|
| 1,196,744 | 8/1916 | Chubb | 29—197.5 X |
| 3,168,381 | 2/1965 | Finnegan et al. | 29—197.5 |
| 3,180,022 | 4/1965 | Briggs | 29—197.5 |
| 3,226,808 | 1/1966 | Thomas | 29—157.3 |
| 3,191,418 | 6/1965 | Modine | 165—166 |
| 3,290,129 | 12/1966 | Mock | 29—197.5 |

FOREIGN PATENTS 1,462,160  11/1966  France.

ROBERT A. O'LEARY, Primary Examiner

THEOPHIL W. STREVLE, Assistant Examiner

U.S. Cl. X.R.

29—197, 199; 75—138